US011762361B2

(12) United States Patent
Heck

(10) Patent No.: US 11,762,361 B2
(45) Date of Patent: Sep. 19, 2023

(54) CONTROL SYSTEM AND METHOD FOR OPERATING A SYSTEM

(71) Applicant: Leica Microsystems CMS GmbH, Wetzlar (DE)

(72) Inventor: Andreas Heck, Friedelsheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 282 days.

(21) Appl. No.: 17/198,313

(22) Filed: Mar. 11, 2021

(65) Prior Publication Data
US 2021/0286335 A1    Sep. 16, 2021

(30) Foreign Application Priority Data
Mar. 16, 2020    (EP) ..................................... 20163361

(51) Int. Cl.
  *G05B 19/05*    (2006.01)
  *G02B 21/00*    (2006.01)
(52) U.S. Cl.
  CPC .............. *G05B 19/05* (2013.01); *G02B 21/00* (2013.01); *G05B 2219/1215* (2013.01)
(58) Field of Classification Search
  CPC ................................. G05B 19/05; G05B 21/00
  USPC ............................................................. 700/3
  See application file for complete search history.

(56) References Cited

U.S. PATENT DOCUMENTS

| | | |
|---|---|---|
| 5,072,374 A | 12/1991 | Sexton et al. |
| 6,009,455 A * | 12/1999 | Doyle ................... G06F 9/5072 709/201 |
| 2001/0021897 A1 | 9/2001 | Voigt et al. |
| 2013/0147941 A1 | 6/2013 | Okada |
| 2015/0130920 A1 | 5/2015 | Zou et al. |
| 2016/0062929 A1 * | 3/2016 | Yeh ........................ G06F 13/364 710/110 |
| 2016/0091883 A1 * | 3/2016 | Fujiwara ............... G05B 19/058 700/3 |
| 2016/0094228 A1 * | 3/2016 | Sato .................. H03K 19/17724 326/38 |
| 2018/0262637 A1 * | 9/2018 | Uchibori ............ H04N 1/00344 |

(Continued)

FOREIGN PATENT DOCUMENTS

| | | |
|---|---|---|
| EP | 3045987 A1 | 7/2016 |
| JP | H03-175560 A | 7/1991 |

(Continued)

*Primary Examiner* — Md Azad
(74) *Attorney, Agent, or Firm* — Leydig, Voit & Mayer, Ltd.

(57) ABSTRACT

A control system for operating a system having an operable component includes a master and a slave assigned to the component. The master and the slave each comprise a software processing part and a programmable logic part. The master is configured by its software processing part to: receive job data, transform the job data into component job data, and send the component job data to the slave. The master is configured by its programmable logic part to send information about a current job status to the slave. The slave is configured by its programmable logic part to receive the information about the current job status, and to send information about the current job status to its software processing part. The slave is configured by its software processing part to execute a job corresponding to the component job data using the current job status.

12 Claims, 2 Drawing Sheets

(56) References Cited

U.S. PATENT DOCUMENTS

2020/0344114 A1 10/2020 Kanai et al.
2021/0116695 A1 4/2021 Weber et al.

FOREIGN PATENT DOCUMENTS

| JP | H08-043738 A | 2/1996 |
|----|---|---|
| JP | H11-119971 A | 4/1999 |
| JP | 2001-215413 A | 8/2001 |
| JP | 2007-121337 A | 5/2007 |
| JP | 2012-230529 A | 11/2012 |
| JP | 2013-125069 A | 6/2013 |
| JP | 2015-523587 A | 8/2015 |
| JP | 2020-518027 A | 6/2020 |
| WO | WO 2019/138568 A1 | 7/2019 |

* cited by examiner

CONTROL SYSTEM AND METHOD FOR OPERATING A SYSTEM

CROSS-REFERENCE TO PRIOR APPLICATIONS

Priority is claimed to European Patent Application No. EP 20163361.7, filed on Mar. 16, 2020, the entire disclosure of which is hereby incorporated by reference herein.

FIELD

The present invention essentially relates to a control system for operating a system, e.g. a microscopy system, comprising an operable component for performing a task, a system comprising such control system, and a method for operating such a system.

BACKGROUND

Systems like microscopy systems typically include several operable components for performing tasks, e.g. with respect to analyzing objects. A typical example is a microscopy system including a detector and a light source, both of which have to be operated in a coordinated manner. For example, the light source shall illuminate the object (or sample) in a specific way and at a specific time, and the detector shall detect light reflected from the object at that specific time.

In order to operate the system, such operable components can be controlled by means of a control system that is communicatively connected to the operable components by means of a network or network connection. Such control system, however, has the disadvantage that processes that need to be synchronous in time cannot be performed since network connections typically have to manage a very large number of (communication) services and data and, typically, many software stacks have to be run.

The use of so-called time sensitive networking (TSN) can provide some improvement in real time communication, however, it is still based on the network connection and, in addition, all components must support this specific type of networking.

SUMMARY

In an embodiment, the present invention provides a control system for operating a system comprising an operable component for performing a task. The control system includes a master and a slave assigned to the component. The master and the slave each comprise a software processing part and a programmable logic part. The master is configured by its software processing part to: receive job data for operating the system from an external processor, transform the job data into component job data for operating the component of the system, and send the component job data to the slave assigned to the component. The slave is configured by its software processing part to receive the component job data from the master. The master is configured to execute a job corresponding to the job data and, by the programmable logic part of the master, is configured to send information about a current job status to the slave. The slave is configured by its programmable logic part to receive the information about the current job status from the master, and to send information about the current job status to the software processing part of the slave. The slave is configured by its software processing part to execute a job corresponding to the component job data using the current job status.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
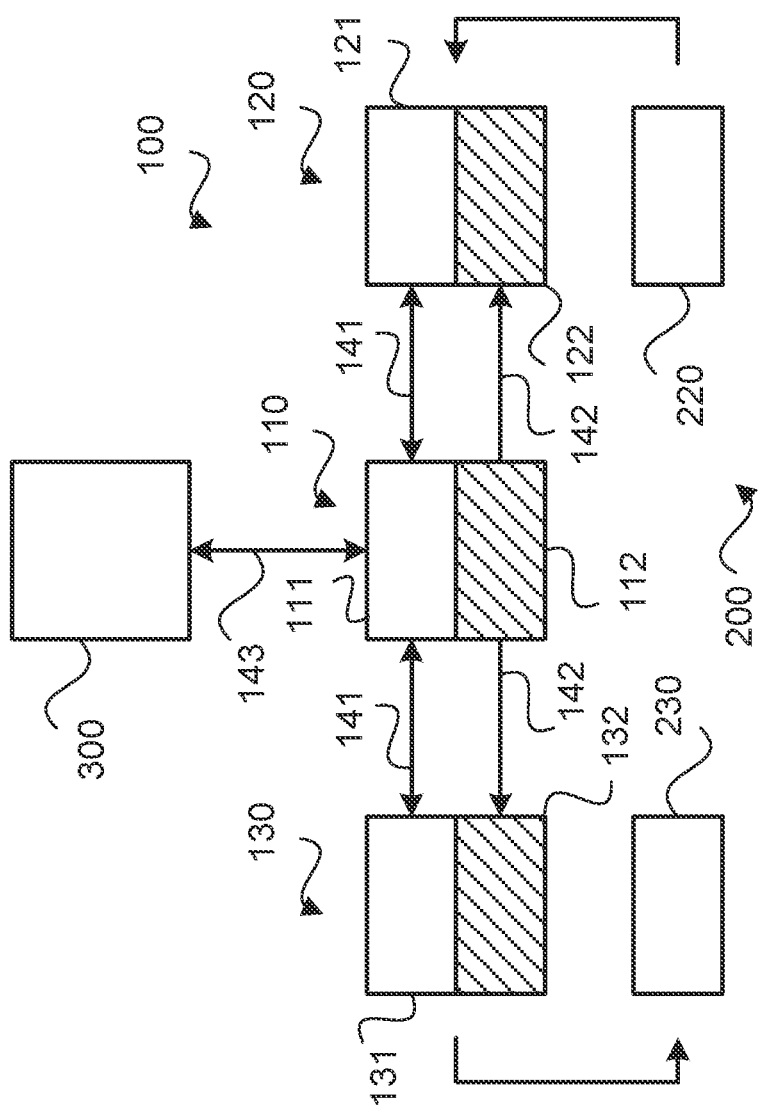
FIG. 1 shows a schematic overview of a system according to the invention in a preferred embodiment.

Embodiments of the present invention improve control or operation of a system having one or several (distributed) operable components, in particular with respect to time sensitive operations.

In an embodiment, the present invention provides a control system for operating a system comprising an operable component for performing a task. While an embodiment of the present invention even works with a single operable component, two or more of such components can be involved in the same way. In case of several operable components, the features described in the following can be applied to each of them. Thus, the control system is used to perform a specific job which can include a number of (in part different) steps and/or tasks.

A preferred kind of system for which the control system is used, is a microscopy system, including at least one component for performing a task referring to analyzing an object (or sample). The at least one component can be selected, for example, from: a detector, a light source, a frequency generator, for example for an acousto-optic component, a mirror galvanometer, and a motor, for example for moving at least one of a filter, a mirror, an aperture, a lens, an objective, and an object table. Also, each of these components being movable by the motor can be used as an operable component. Typically, such microscopy system includes several of these operable components. It is to be noted that although embodiments of the invention will be described with respect to a microscopy system and some specific operable components, the invention is not limited to such microscopy system.

The control system comprises a master unit and a slave unit, which is assigned to the component. The master unit and the slave unit can also be referred to as simply master and slave, respectively and each comprise a software processing part and a programmable logic part. In particular, each of the software processing parts comprises a microprocessor running a software, and each of the programmable logic parts comprises a field programmable gate array (FPGA), a programmable logic device (PLD) or an application-specific integrated circuit (ASIC).

A field-programmable gate array (FPGA) is an integrated circuit designed to be configured by a customer or a designer after manufacturing. The FPGA configuration is, generally, specified using a hardware description language (HDL), similar to that used for an application-specific integrated circuit (ASIC). Circuit diagrams were previously used to specify the configuration, but this is increasingly rare due to the advent of electronic design automation tools. A programmable logic device (PLD) is an electronic component used to build reconfigurable digital circuits. Unlike integrated circuits (IC or ASIC) which consist of logic gates and have a fixed function, a PLD has an undefined function at the time of manufacture. Before the PLD can be used in a circuit it must be programmed (reconfigured) by using a specialized program.

An application-specific integrated circuit (ASIC) is an integrated circuit (IC) chip customized for a particular use, rather than intended for general-purpose use. ASIC chips are typically fabricated using metal-oxide-semiconductor (MOS) technology, as MOS integrated circuit chips. FPGAs, PLDs and ASICs are generally known and will, thus, not be further described herein.

It is to be noted that the processor or microprocessor of the software processing parts mentioned before, also can be made by or be provided as an FPGA (or PLD or ASIC). Thus, both, the software processing part and the programmable logic part, can be provided in a common, single physical unit, e.g. an FPGA.

Preferably, the control system comprises a first communication line connecting the software processing part of the master unit with the software processing part of the slave unit, and further comprises a second communication line connecting the programmable logic part of the master unit with the programmable logic part of the slave unit. It is also of advantage, if the software processing parts (of the master unit and of the slave unit) and the programmable logic parts (of the master unit and of the slave unit) are arranged to (or configured to) use protocols of different levels. In particular, the software processing parts can be arranged to (or configured to) use a network protocol (which is, preferably, a high-level protocol), in particular, a transmission control protocol (TCP) or similar, and/or the programmable logic parts are arranged to use a protocol comprising bit or byte sequences for commands or similar (which is, preferably, a low-level protocol). This allows separate communication between the software processing parts on the one side and between the programmable logic parts on the other side. While a network (or high-level) protocol allows easy and efficient configuration of slave units (receiving job data in the software processing part), the low-level protocol allows time synchronous processing (at the programmable logic level). Such job data is, preferably, data that define different steps and/or tasks to be performed and, e.g., includes instructions to be executed in order to perform such steps and/or tasks (as the job is defined, e.g., by steps and/or tasks to be performed).

Further, the master unit, by means of its software processing part, is arranged to (or configured to) receive job data, for operating the system, from an external processing unit like a (host) PC or other computer or computing unit, to transform the job data into component job data, for operating the component of the system, and to send the component job data to the slave unit, which is assigned to the component. In other words, job data from the external source that includes information for all operable components involved in a specific job (e.g., scanning an object or sample, manipulating and/or bleaching a sample) is received and only that information relevant or necessary for the specific operable component is selected and transferred the respective slave unit. The slave unit, by means of its software processing part, is arranged to (or configured to) receive the component job data from the master unit. Within software processing part of the slave unit, the component job data can then be composed to a (component) job for the respective component, which will late be processed.

Further, the master unit is arranged to execute the job corresponding to the job data and, by means of its programmable logic part, is arranged to (or configured to) send information about a current job status to the slave unit. In other words, the relevant actions for performing the job are initialized or caused by the master unit and the master unit notifies the slave unit about the current status like the current line number of scanning or reaching the end of a line (if the job includes scanning of an object of sample).

The slave unit, by means of its programmable logic part, is arranged to (or configured to) receive the information about the current job status (e.g., the current line number of scanning or reaching the end of a line) from the master unit. Further, the slave unit, by means of its programmable logic part, is arranged to (or configured to) send information about the current job status to the software processing part of the slave unit. Such job status can include, e.g., information about having reached the end of a line (if the job includes scanning of an object of sample). Further, the slave unit, by means of its software processing part, is arranged to (or configured to) execute the job corresponding to the component job data using the current job status.

This allows an autonomous process of the job at or within the slave unit. For example, the slave unit might be responsible for setting a light intensity during scanning. Then, if the software processing part is informed by the programmable logic part that the end of a line is reached, the software processing part can decide whether to change light intensity (e.g., if the next line is of an odd number) or not. This means that the slave unit, by means of its software processing part, is preferably arranged to (or configured to) react on the information about the current job status received from its programmable logic part. This reaction on the information about the current job status received from its programmable logic part can comprise generating an operating command for the component corresponding to the component job data, like setting a different intensity of a light.

Since the information about the current job status, which is obtained at the programmable logic part level, is transferred only within the slave unit, there is no stage like a network connection that might introduce time delay or the like. The network or high-level protocols are only used for configuration of the master and slave units, while any—time relevant—changes during the process of a job are initiated by the low-level connections and protocols.

It is to be noted that in this way the control system cannot only be configured for capturing a single image (possibly including several lines of scanning), but it can be configured for many images with, in particular, different parameters for the individual operable components can be configured with the job. All necessary parameters for such different configurations are distributed to the individual slave units before the start of the job. During the process, any change in configuration is initiated only by communication from programmable logic parts to respective software processing parts, i.e., by interrupts.

In another embodiment, the present invention provides a system including at least one operable component for performing a task, preferably, two or more of such operable components. The system also comprises the control system according to the an embodiment of the invention. Advantageously, the system is a microscopy system in which the at least one operable component is for performing a task refers to analyzing an object. As already mentioned before, the at least one operable component can be selected, for example, from: a detector, a light source, a frequency generator, for example for an acousto-optic component, a mirror galvanometer, and a motor, for example for moving at least one of a filter, a mirror, an aperture, a lens, an objective, and an object table.

In a further embodiment, the present invention provides a method for operating a system like a microscopy system, the system comprising an operable component for performing a task, using the control system according to an embodiment of the invention, the method comprising: sending job data, for operating the system, to the software processing part of the master unit, transforming the job data, by means of the software processing part of the master unit, into component job data, for operating the component of the system, sending the component job data from the software processing part of the master unit to the software processing part of the slave unit, executing, by the master unit, the job corresponding to the job data, sending, by means of the programmable logic part of the master unit, information about a current job status to the programmable logic part of the slave unit, sending, by means of the programmable logic part of the slave unit, information about the current job status to the software processing part of the slave unit, and executing, by means of the software processing part of the slave unit, the job corresponding to the component job data using the current job status. Preferably, the method further comprises: reacting, by means of the software processing part of the slave unit, on the information about the component job status received from its programmable logic part.

With respect to further embodiments and advantages of the system and the method, it is referred to the remarks above, which apply correspondingly.

In a further embodiment, the present invention also provides a computer program with a program code for performing a method according to an embodiment of the invention when the computer program is run on a processor.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of embodiments of the present invention.

In FIG. 1, a schematic overview of a system 200 according to the invention in a preferred embodiment is shown. The system 200 is, by means of example, a microscopy system, and comprises a control system 100. The control system 100, in turn, is a control system according to the invention in a preferred embodiment.

The control system 100 comprises a master unit 110 and, by means of example, two slave units 120, 130. Each of the slave units 120, 130 is assigned to a component 220 and 230, respectively, of the system 200. Each of the components 220 and 230 is arranged to perform a (specific) task within the microscopy system 200. By means of example, component 220 is a detector, and component 230 is a light source. Thus, the microscopy system can be used to scan an object or a sample by means of the light source 230 and detect reflecting light by means of the detector 220.

The master unit 110 comprises a software processing part 111 and a programmable logic part (e.g., an FPGA) 112. Also, each of the slave units 120, 130 comprises a software processing part 121, 131 and a programmable logic part (e.g., an FPGA) 122, 132. The software processing part 111 of the master unit 110 is connected with each of the software processing parts 121, 131 of the slave units 120, 130 by means of a first communication line 141, which enables a bi-directional communication and is configured for, e.g., a high-level protocol, in particular, a TCP protocol. The programmable logic part 112 of the master unit 110 is connected with each of the programmable logic parts 122, 132 of the slave units 120, 130 by means of a second communication line 142, which is configured for, e.g., a low-level protocol using bit or byte sequences for commands.

The software processing part 111 of the master unit 110 is connected, by means of a third communication line 143, which enables a bi-directional communication and is configured for, e.g., TCP protocol, to an external processing unit 300, for example a (host) PC or a computer or the like. The slave unit 120 is assigned to the detector 220 and, thus, is also configured to control the detector 220, which includes, in particular, receiving image data from the detector and/or controlling the detector when to acquire an image and/or to set specific parameters of the detector like exposure time and the like. The slave unit 130 is assigned to the light source 230 and, thus, is also configured to control the light source 230, which includes, in particular, setting light intensities and/or switching the light source on and off and/or moving the light spot in x- and/or y-direction.

The specific features and tasks of the operable) components of the control system 100 will be described with respect to the flow diagram of FIG. 2.

Figure 2:
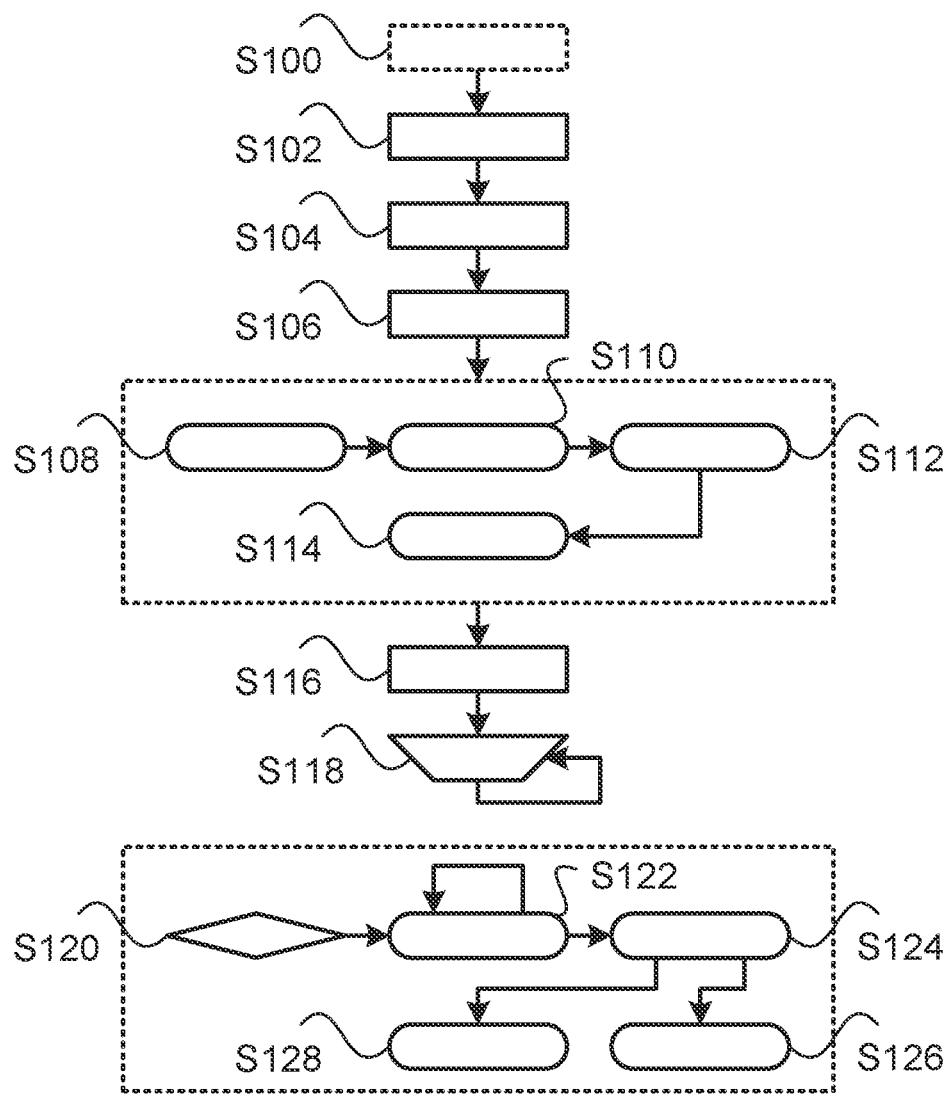
FIG. 2 shows, schematically, a flow scheme describing a method according to the invention in a preferred embodiment.

In FIG. 2, a flow scheme is shown, which schematically describes a method according to the invention in a preferred embodiment. It is to be noted that, at least in part, the features described with respect to the method also apply to the control system, in particular, since the control system is arranged to perform specific tasks corresponding to the method steps. By means of example, an object or sample shall be analyzed by means of a microscopy system, using a light source for scanning the object in several lines.

The tasks to be performed within the method or the control system are denoted by steps or blocks in FIG. 2. With respect to the different entities (software processing parts and programmable logic parts of the master unit and slave units) and the tasks to be performed, the following is to be noted: in FIG. 2, tasks performed on or by the software processing part of the master unit are shown as blocks of rectangular shape, tasks performed on or by the software processing parts of the slave units are shown as blocks of rectangular shape with rounded corners, tasks performed on or by the programmable logic part of the master unit are shown as blocks of trapezoidal shape, and tasks performed on or by the programmable logic parts of the slave units are shown as blocks of rhomboidal shape.

In step S100, a job to be performed with the (microscopy) system is defined at the host PC. With respect to the present example, the job can include and define the way of scanning the object, e.g., the number of lines to be scanned, the length of the lines, the x- and/or y-dimensions of the scan and for the lines, and exposure times of the detector, and the light intensity to be used for specific lines. Also, the job can include several images to be acquired, with different parameters for different images.

In step S102, the job data created on the host PC is transferred or sent to the software processing part of the master unit, and the software processing part of the master unit receives this job data.

In step S104, the received job data is analyzed and transformed, by means of the software processing part of the master unit, into component job data. This is, the information and/or data which are relevant or necessary for each of the slave units are chosen from the (general) job data. With respect to the present example, this step might include choosing all job data referring to light intensity and putting it into the component job data for the light source.

In step S106, the component job data is sent or transferred from the software processing part of the master unit to the software processing parts of the slave units. In step S108, the component job data, received from the master unit, is analyzed at or in each of the slave units by means of the respective software processing part. In step S110, a job is created for the respective slave unit from the component job data. This is, e.g., a specific plan including parameters for controlling the light source and the like are prepared, such that the job can be started upon request. In step S112, each of the slave units subscribes itself (if applicable) to relevant events like scanner events, which will be received from the programmable logic part during process (see also step S120 below). Such events may include, e.g., reaching the end of a line during scanning. At step S114, the slave unit is ready (or prepared) for starting the job.

In step S116, the job corresponding to the job data is executed by the master unit and, in step S118, information about a current job status is sent, by means of the programmable logic part of the master unit, to the programmable logic part of each the slave units. This step S118 is performed as long as the job requires, and it ends when the job is finished. In this way, the master unit notifies the slave units about a current job status like, e.g., a current scanning state. For example, the master unit notifies the slave unit (in particular, at the programmable logic level) about the change to a new line to scan.

During step S118 (which lasts until the end of the job, as mentioned before), in step S120, the programmable logic part of each of the slave units receives the events from the master unit (see above) and, in addition, sends information about the current job status to the software processing part of the (same) slave unit, which correspond to or are kind of interrupts. Such information about the current job status can include, for example, (reaching) the beginning of a line, (reaching the end of a line, (reaching) the beginning of an image to be captured, (reaching) the end of an image to be captured, starting a new line (during scanning), the beginning of the job, and the end of the job.

Based on this information about the current job status, i.e. any change during the process of the job, which is relevant for the respective component like the light source, the job corresponding to the component job is executed, by means of the software processing part of the slave unit.

The job to be executed by a specific slave unit which was created before (see steps S108 to S114) basically is present at the software processing part of the slave unit. Any actions required by the job, however, are triggered by the information about the current job status received from the respective programmable logic part. An example will be presented with the next few steps.

In step S122, the software processing part of the slave unit (repeatedly or continuously) performs a check, whether the end of the line to be scanned has been reached. The information, that the end of the line has been reached is received from the programmable logic part, as described with respect to step S120 before. When the end of the line has been reached, then, in step S124, the software processing part of the slave unit checks, whether the next line to be scanned has an odd line number (this is possible since the component job data present in the software processing part of the slave unit includes this information).

If the next line to be scanned does not have an odd line number (i.e., it has an even line number), then, in step S126, the intensity of the light source is set to 100%. If the next line to be scanned does have an odd line number, then, in step S128, the intensity of the light source is set to 50%. In other words, the software processing part reacts on the information about the current job status received from the programmable logic part and, thus, can handle interrupts from the programmable logic part.

In the same way, the programmable logic part can inform the respective software processing part about the start of the job, further ends of lines, the end of the job, the start of a new job with, e.g., another kind of image to be acquired and the like.

Such job data could also include, besides two-dimensional images to be acquired, defining specific geometries in the space like a sphere, to be scanned. The job data could also include collecting image data when the end of a line or the end of an image is reached. Also, the job data could include the task to acquire images outside the range of regular imaging, e.g., during resetting the scanning light to the beginning of the next line.

To sum up, the invention provides the possibility to define, by means of a host PC or the like, a specific job to be performed with a (microscopy) system with appropriate operable components like light source and detector, to transfer this job (data) to the master unit, distribute the relevant component job data to the respective slave units assigned to the operable components, and to perform the job, once it has been fully distributed, in an autonomous way. Any communication, during the process, is limited to such from the controlling system to the host PC, but no (real time) communication between the individual components or the respective controlling units (the slave units) is necessary.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A control system for operating a system, the system comprising an operable component for performing a task, the control system comprising:
   a master and a slave assigned to the component, each of the master and the slave comprising a software processing part and a programmable logic part,
   wherein the master is configured to, by the software processing part of the master:
      receive job data for operating the system from an external processor,
      transform the job data into component job data for operating the component of the system, and
      send the component job data to the slave assigned to the component,
   wherein the slave is configured to, by the software processing part of the slave, receive the component job data from the master,
   wherein the master is configured to execute a job corresponding to the job data and to, by the programmable logic part of the master, send information about a current job status to the slave, and
   wherein the slave is configured to, by the programmable logic part of the slave, receive the information about the current job status from the master, and to send information about the current job status to the software processing part of the slave, wherein the programmable logic parts of the master and the slave are configured to communicate with each other via a first protocol, the software processing parts of the master and the slave are configured to communicate with each other via a second protocol, the first protocol being a lower level protocol than the second protocol, and
   wherein the slave is configured to, by the software processing part of the slave, execute a job corresponding to the component job data using the current job status.

2. The control system of claim 1, wherein the slave is configured by the software processing part of the slave to react on the information about the current job status received from the programmable logic part of the slave.

3. The control system of claim 2, wherein reacting on the information about the current job status received from the programmable logic part of the slave comprises generating an operating command for the component corresponding to the component job data.

4. The control system of claim 1, further comprising a first communication line connecting the software processing part of the master with the software processing part of the slave, and a second communication line connecting the programmable logic part of the master with the programmable logic part of the slave.

5. The control system of claim 1, wherein each of the software processing parts comprises a microprocessor running software, and wherein each of the programmable logic parts comprises a field programmable gate array, a programmable logic device or an application-specific integrated circuit.

6. The control system of claim 1, wherein the first protocol used by the software processing parts of the master and the slave comprises a transmission control protocol (TCP), and the second protocol used by the programmable logic parts of the master and the slave comprises bit or byte sequences for commands.

7. A system including at least one operable component for performing a task, the system comprising the control system of claim 1.

8. The system of claim 7, wherein the system is a microscopy system, and
wherein the at least one operable component is configured to analyze an object as the task.

9. The system of claim 8, wherein the at least one component includes one of: a detector, a light source, a frequency generator, a mirror galvanometer, and a motor.

10. A method for operating a system comprising an operable component for performing a task, using the control system of claim 1, the method comprising:
sending the job data for operating the system to the software processing part of the master,
transforming the job data, by the software processing part of the master, into the component job data for operating the component of the system,
sending the component job data from the software processing part of the master to the software processing part of the slave,
executing, by the master, the job corresponding to the job data,
sending, by the programmable logic part of the master, the information about the current job status to the programmable logic part of the slave,
sending, by the programmable logic part of the slave, the information about the current job status to the software processing part of the slave, and
executing, by the software processing part of the slave, the job corresponding to the component job data using the current job status.

11. The method of claim 10, further comprising: reacting, by the software processing part of the slave, on the information about the component job status received from the programmable logic part of the slave.

12. A tangible, non-transitory computer-readable medium having instructions thereon for performing the method according to claim 10 when the instructions are executed on one or more processors.

* * * * *